(12) United States Patent
Park

(10) Patent No.: US 8,421,738 B2
(45) Date of Patent: Apr. 16, 2013

(54) LIQUID CRYSTAL DISPLAY AND METHOD OF DISPLAYING IMAGE IN THE SAME

(75) Inventor: Woon-yong Park, Gyeonggi-do (KR)

(73) Assignee: Tovis Co., Ltd., Incheon (KR)

( * ) Notice: Subject to any disclaimer, the term of this patent is extended or adjusted under 35 U.S.C. 154(b) by 320 days.

(21) Appl. No.: 12/997,515

(22) PCT Filed: Jun. 9, 2009

(86) PCT No.: PCT/KR2009/003067
§ 371 (c)(1),
(2), (4) Date: Dec. 10, 2010

(87) PCT Pub. No.: WO2009/151247
PCT Pub. Date: Dec. 17, 2009

(65) Prior Publication Data
US 2011/0080387 A1   Apr. 7, 2011

(30) Foreign Application Priority Data

Jun. 12, 2008   (KR) .................. 10-2008-0055422

(51) Int. Cl.
*G09G 3/36* (2006.01)
(52) U.S. Cl.
USPC ........................................ 345/100; 345/204
(58) Field of Classification Search ............... 345/87, 345/98, 100, 204
See application file for complete search history.

(56) References Cited

U.S. PATENT DOCUMENTS

| 7,372,442 B2* | 5/2008 | Koyama et al. ............... 345/100 |
| 2005/0052443 A1* | 3/2005 | Yamamoto et al. ........... 345/204 |
| 2008/0036753 A1* | 2/2008 | Washio et al. ................ 345/204 |

FOREIGN PATENT DOCUMENTS

| JP | 11-237863 A | 8/1999 |
| JP | 2003-316315 A | 11/2003 |
| KR | 2001-0069091 A | 7/2001 |
| KR | 2006-0020522 A | 3/2006 |

* cited by examiner

*Primary Examiner* — Kevin M Nguyen
(74) *Attorney, Agent, or Firm* — Rabin & Berdo, P.C.

(57) ABSTRACT

The present invention relates to a liquid crystal display and a method of displaying images, and a liquid crystal display includes: a liquid crystal panel assembly including a plurality of gate lines, a plurality of data lines crossing with the gate lines, and a plurality of pixels which are respectively connected to one of gate lines and one of the data lines; and a driver providing an image signal to the pixels. At least a portion of a non-display area of the liquid crystal panel assembly is cut and removed, and the driver displays black at a first display area in the vicinity of the removed non-display area. An area displaying images can be surrounded by black and thus image can be well-balancedly displayed without being biased in the whole screen so as to improve display quality.

20 Claims, 10 Drawing Sheets

LIQUID CRYSTAL DISPLAY AND METHOD OF DISPLAYING IMAGE IN THE SAME

FIELD OF THE INVENTION

The present invention relates to a liquid crystal display and a method of displaying image.

BACKGROUND ART

Generally, a liquid crystal display (LCD) includes two display panels and a liquid crystal layer disposed therebetween and having a dielectric anisotropy. An electric filed is formed in the liquid crystal layer, and a transmittance of light passing the liquid crystal layer is regulated by regulating amplitude of the electric field so as to obtain a desired image. Such a liquid crystal display is representative one of a flat panel display (FPD), and TFT-LCD which uses thin film transistor (TFT) as a switching element is widely used.

Generally, a plurality of display signal lines which cross with each other, i.e., gate lines and data lines are formed on the display panel to which thin film transistors are formed, and in a pixel area of matrix shape which is defined by crossing of gate lines and data lines, a plurality of thin film transistors and pixel electrodes are formed. The thin film transistor controls data signal which is transmitted through the data line by a data driving IC (integrated circuit) according to a gate signal which is transmitted through the gate line by a gate driving IC and transmits the same to the pixel electrode.

A display screen of a liquid crystal display may be divided into a display area and a non-display area. In the display area, pixels exist and an image is displayed therein, but in the non-display area which surrounds the display area, pixels do not exist and a black matrix covers thereon so that black is displayed thereon. In a particular case, a liquid crystal display may not include the non-display area, and in this case, an image displayed on the screen is not displayed in balance so that display quality may be deteriorated.

DETAILED DESCRIPTION OF THE INVENTION

Technical Problem

The present invention has been made in an effort to provide a liquid crystal display and a method of displaying image of the same which can balancedly display image so as to improve display quality in case that there is no non-display area.

Technical Solution

An exemplary embodiment of the present invention provides a liquid crystal display including: a liquid crystal panel assembly including a plurality of gate lines, a plurality of data lines crossing with the gate lines, and a plurality of pixels which are respectively connected to one of gate lines and one of the data lines; and a driver providing an image signal to the pixels. At least a portion of a non-display area of the liquid crystal panel assembly is cut and removed, and the driver displays black at a first display area in the vicinity of the removed non-display area.

The liquid crystal panel assembly may be cut along the gate line and the first display area is formed along the gate line.

The first display area may correspond to at least one gate line, and the driver may provide black data to a pixel connected to the at least one gate line.

The first display area may correspond to at least one gate line, and the at least one gate line may be connected to gate-off voltage.

The first display area may correspond to a plurality of gate lines, and at least two gate lines of the plurality of the gate lines may be connected to each other.

The liquid crystal panel assembly may be cut along the data line and the first display area is formed along the data line.

The first display area may correspond to at least one data line, and the driver may provide black data to a pixel connected to the at least one data line.

The liquid crystal panel assembly may be cut along the gate line and along the data line and the first display area is formed along the gate line and along the data line.

The first display area may correspond to at least one gate line and at least one data line, and the driver may provide black data to a pixel connected to the at least one gate line and to at least one data line.

The driver may provide dummy data to the liquid crystal panel assembly.

An exemplary embodiment of the present invention provides a method of displaying image of a liquid crystal display including a liquid crystal panel assembly including a plurality of gate lines, a plurality of data lines crossing with the gate lines, and a plurality of pixels which are respectively connected to one of gate lines and one of the data lines, including displaying black in a first display area of the liquid crystal panel assembly. A non-display area of the liquid crystal panel assembly in the vicinity of the first display area is cut and removed.

The liquid crystal panel assembly may be cut along the gate line and the first display area is formed along the gate line.

The first display area may correspond to at least one gate line, and the method may further includes providing black data to a pixel connected to the at least one gate line.

The first display area may correspond to at least one gate line, and the at least one gate line may be connected to gate-off voltage.

The first display area may correspond to a plurality of gate lines, and at least two gate lines of the plurality of the gate lines may be connected to each other.

The liquid crystal panel assembly may be cut along the data line and the first display area is formed along the data line.

The first display area may correspond to at least one data line, and the method may further include providing black data to a pixel connected to the at least one data line.

The liquid crystal panel assembly may be cut along the gate line and along the data line and the first display area may be formed along the gate line and along the data line.

The first display area may correspond to at least one gate line and at least one data line, and the method may further include providing black data to a pixel connected to the at least one gate line and to at least one data line.

The method may further include providing dummy data to the liquid crystal panel assembly.

Advantageous Effects

According to the present invention, even in case that at least a portion of a liquid crystal panel assembly is removed so that there is no non-display area, black data is provided at display area corresponding to the same, so an area displaying images can be surrounded by black and thus image can be well-balancedly displayed without being biased in the whole screen so as to improve display quality.

BRIEF DESCRIPTIONS OF DRAWINGS

BEST MODE

Figure 1:
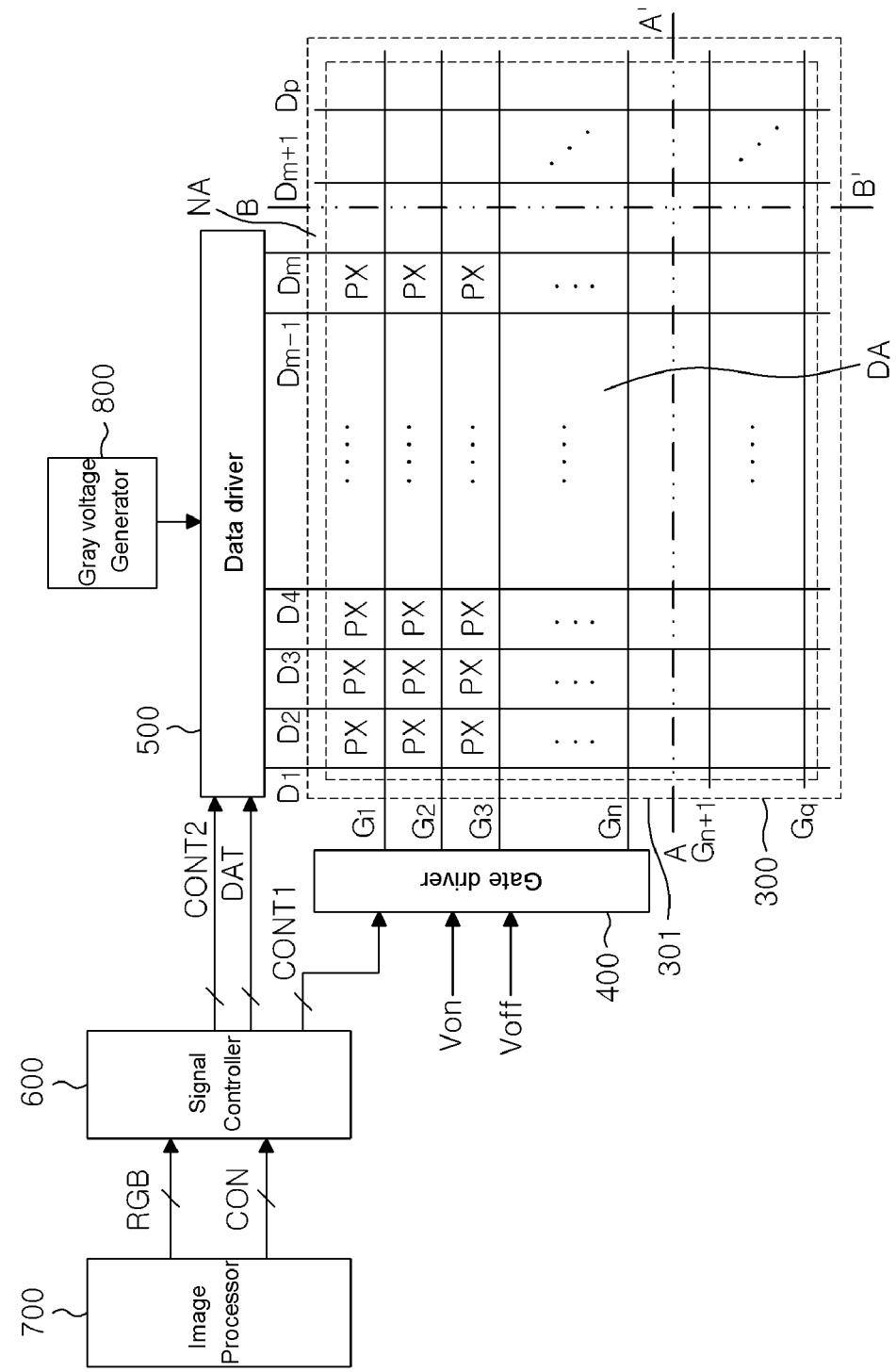
FIG. 1 is a block diagram of a liquid crystal display according to an exemplary embodiment of the present invention.

The present invention will now be described more fully hereinafter with reference to the accompanying drawings, in which preferred embodiments of the invention are shown.

In the drawings, the thickness of layers, films, panels, regions, etc. are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

First, referring to FIG. 1 to FIG. 3, a liquid crystal display and a method of displaying image according to an exemplary embodiment of the present invention will be explained in detail.

Figure 2:
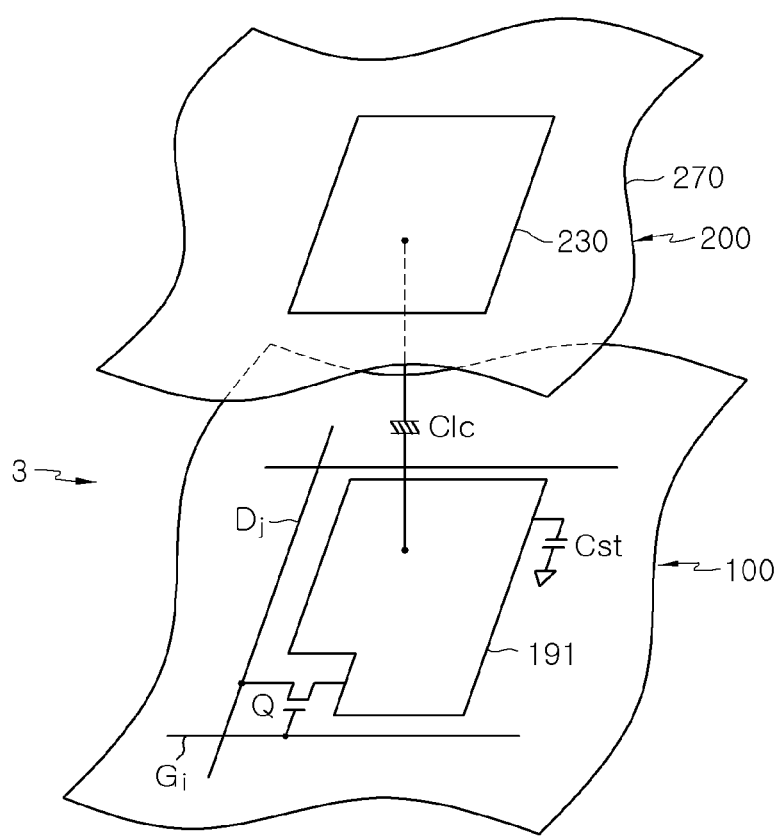
FIG. 2 is an equivalent circuit diagram of one pixel of a liquid crystal display according to an exemplary embodiment of the present invention.

FIG. 1 is a block diagram of a liquid crystal display according to an exemplary embodiment of the present invention. FIG. 2 is an equivalent circuit diagram of one pixel of a liquid crystal display according to an exemplary embodiment of the present invention. FIG. 3 is a schematic diagram of a liquid crystal panel assembly according to an exemplary embodiment of the present invention.

As shown in FIG. 1, a liquid crystal display according to an exemplary embodiment of the present invention includes a liquid crystal panel assembly 300, a gate driver 400 and a data driver 500 connected to liquid crystal panel assembly 300, a gray voltage generator 800 connected to data driver 500, a signal controller 600 controlling these members, and an image processor 700 providing an image signal to signal controller 600.

Liquid crystal panel assembly 300 includes a plurality of signal lines $G_1$ to $G_q$ and $D_1$ to $D_p$, and a plurality of pixels PX connected to signal lines and substantially arranged in a matrix shape. Meanwhile, in a structure shown in FIG. 2 and FIG. 3, liquid crystal panel assembly 300 includes lower and upper panels 100 and 200 which face each other, and a liquid crystal layer 3 which is interposed between panels 100 and 200 and includes liquid crystal molecules which are aligned vertically or horizontally. Lower panel 100 may be referred to as a thin film transistor array panel, and upper panel 200 may be referred to as a color filter array panel.

A sealant 310 which is made of material for bonding two panels 100 and 200 and defines a space which is filled with liquid crystal and prevents leak of liquid crystal is formed at edges of two panels 100 and 200, and polarizers 12 and 22 for polarizing light are respectively attached to outer surfaces of two panels 100 and 200. One of polarizers 12 and 22 may be omitted.

Signal lines $G_1$ to $G_q$ and $D_1$ to $D_p$ include a plurality of gate lines $G_1$ to $G_q$ which transmit gate signals (also referred to as "scanning signal"), and a plurality of data lines $D_1$ to $D_p$ which transmit data signal. Gate lines $G_1$ to $G_q$ substantially extend in a row direction to be parallel to one another, and data lines $D_1$ to $D_p$ substantially extend in a column direction to be parallel to one another.

Each pixel PX, for example, the pixel PX connected to the i-th (i=1, 2, ..., q) gate line $G_i$ and the j-th (j=1, 2, ..., p) data line $D_j$ includes a switching element Q connected to signal lines $G_i$ and $D_j$ and a liquid crystal capacitor Clc and a storage capacitor Cst connected to switching element Q. If necessary, storage capacitor Cst can be omitted.

Switching element Q is a three terminal element such as a thin film transistor, etc. provided to lower panel 100, a control terminal thereof is connected to gate line $G_i$, an input terminal thereof is connected to data line $D_j$, and an output terminal thereof is connected to liquid crystal capacitor Clc and storage capacitor Cst.

Liquid crystal capacitor Clc has two terminals of a pixel electrode 191 of lower panel 100 and a common electrode 270 of upper panel 200, and liquid crystal layer 3 between two electrodes 191 and 270 serves as a dielectric material. Pixel electrode 191 is connected to switching element Q, and common electrode 270 is formed on the entire surface of upper panel 200 and a common voltage is applied thereto. Unlike FIG. 2, common electrode 270 may be provided on lower panel 100, and in this case, at least one of two electrodes 191 and 270 may be formed in a linear or bar shape.

Storage capacitor Cst, which assists liquid crystal capacitor Clc, is defined by the overlap of pixel electrode 191 and a separate signal line (not shown) provided on lower panel 100 with an insulator interposed therebetween, and a predetermined voltage such as common voltage is applied to the separate signal line. However, storage capacitor Cst may be formed by pixel electrode 191 and the overlying previous gate line arranged to overlap each other through the insulator.

Meanwhile, for realizing color display, each pixel PX uniquely displays one of primary colors (spatial division) or each pixel PX alternately displays primary colors (temporal division) as time lapses, and a desired color is recognized by a spatial and temporal sum of primary colors. Examples of primary colors include three primary colors including red, green, and blue. FIG. 2 shows an example of a spatial division, and in this example, each pixel PX has a color filter 230 for one of the primary colors in a region of upper panel 200 corresponding to pixel electrode 191. Unlike FIG. 2, color filter 230 may be formed above or below pixel electrode 191 of lower panel 100.

Referring again to FIG. 1, gray voltage generator 800 generates two sets of gray voltages related to transmittance of pixel PX (a set of reference gray voltage). Each set of the two sets of gray voltages has a positive value and a negative value with respect to common voltage, respectively.

Gate driver 400 is connected to gate line $G_1$ to $G_q$ of liquid crystal panel assembly 300, and applies gate signals, which are combinations of a gate-on voltage Von and a gate-off voltage Voff, to gate lines $G_1$ to $G_q$.

Data driver 500 is connected to data lines $D_1$ to $D_p$ of liquid crystal panel assembly 300. Data driver 500 selects one of gray voltages from gray voltage generator 800, and applies the selected gray voltage to data lines $D_1$ to $D_p$ as a data signal (a data voltage). However, when gray voltage generator 800 supplies the reference gray voltage in a predetermined number, not the voltages for all gray levels, data driver 500 divides the reference gray voltage so as to generate the gray voltages for all gray levels and selects the data voltage among these.

Signal controller 600 controls gate driver 400, data driver 500, and the like.

Each of drivers 400, 500, 600, and 800 may be directly mounted on liquid crystal panel assembly 300 in forms of at least one IC chips, may be attached to liquid crystal panel assembly 300 while being mounted on a flexible printed circuit film (not shown) by a TCP (tape carrier package), or may be mounted on a separate printed circuit board (not shown). Alternately, driver 400, 500, 600, or 800 may be integrated into liquid crystal panel assembly 300, together with signal lines $G_1$ to $G_q$ and $D_1$ to $D_p$ and thin film transistor switching element Q. In addition, driver 400, 500, 600, or 800 may be integrated into a single chip, and in this case, at least one of them or at least one circuit element constituting them may be outside the single chip.

Image processor 700 receives image signals from the outside and stores the same, and generates input image signal RGB and input control signal CON in accordance to display operation of liquid crystal display and transmits the same to signal controller 600. Image signal from the outside may be suitable for resolution and display standard but not so, and in this case, image processor 700 may suitably convert image signal to be suitable for resolution and display standard of liquid crystal display assembly 300.

The operation of the liquid crystal display will now be described in detail.

Signal controller 600 receives input image signals RGB and input control signals CON for controlling display of the input image signals RGB. The input image signals RGB contains information of luminance of each pixel PX, and the luminance has grays of the predetermined number, for example, $1024(=2^{10})$, $256(=2^8)$ or $64(=2^6)$. Examples of the input control signals CON includes a vertical synchronization signal Vsync, a horizontal synchronizing signal Hsync, a main clock MCLK, a data enable signal DE, etc.

Signal controller 600 processes the input image signals RGB according to the operating condition of liquid crystal panel assembly 300 on the basis of the input image signals RGB and the input control signals CON, and generates a gate control signal CONT1 and a data control signal CONT2. Then, signal controller 600 supplies the gate control signal CONT1 to gate driver 400 and supplies the data control signal CONT2 and the processed image data DAT to data driver 500.

The gate control signal CONT1 may include a scanning start signal STV which instructs to start scanning and at least one clock signal which controls output cycle of the gate-on voltage Von. In addition, the gate control signal CONT1 may include an output enable signal OE limiting duration time of the gate-on voltage Von.

The data control signal CONT2 includes a horizontal synchronization start signal STH which notifies transmission of image data DAT to one row of pixels PX, a load signal LOAD instructing to apply the data signal to the data lines $D_1$ to $D_p$, and a data clock signal HCLK. The data control signal CONT2 may also further include an inversion signal RVS for inverting the voltage polarity of the data signal relative to the common voltage (hereinafter, the voltage polarity of the data signal relative to the common voltage is simply referred to as the polarity of the data signal).

On the basis of the data control signal CONT2 from signal controller 600, data driver 500 receives digital image data DAT for one row of pixels PX, and coverts digital image data DAT into the analog data signal by selecting the gray voltage corresponding to each digital image data DAT, and then applies the analog data signal to the data lines $D_1$ to $D_p$.

Gate driver 400 applies the gate-on voltage Von to the gate lines $G_1$ to $G_q$ on the basis of the gate control signal CONT1 from signal controller 600 so as to turn on the switching element Q connected to the gate lines $G_1$ to $G_q$. Accordingly, the data signal applied to data lines $D_1$ to $D_p$ is applied to the corresponding pixel PX through the turned-on switching element Q.

A difference between the voltage of the data signal applied to the pixel PX and the common voltage becomes a charge voltage of the liquid crystal capacitor Clc, that is, a pixel voltage. The alignment of liquid crystal molecules varies according to the value of the pixel voltage, and thus the polarization of light passing through liquid crystal layer 3 is changed. The change in polarization causes a change in transmittance of light by polarizers attached to liquid crystal panel assembly 300.

By repeating this operation for every one horizontal period (referred to as "1H" and equal to one cycle of the horizontal synchronizing signal Hsync), the gate-on voltage Von is sequentially applied to all of the gate lines $G_1$ to $G_q$, so data signal is applied to all pixels PX, thereby displaying image of one frame.

If one frame is completed, and a next frame starts, the state of the inversion signal RVS to be applied to data driver 500 is controlled such that the polarity of the data voltage to be applied to each pixel is opposite to the polarity thereof in the previous frame ("frame inversion"). At this time, the polarity of the data signals on one data line may be changed in one frame according to the characteristics of the inversion signal RVS (for example, row inversion or dot inversion), or the polarity of the data signals applied to a row of pixels may be different from each other (for example, column inversion or dot inversion).

A method for manufacturing a liquid crystal display having desired size by cutting and forming the above-described liquid crystal display will be explained in more detail with reference to FIG. 4 together with FIG. 1 and FIG. 3.

Figure 3:
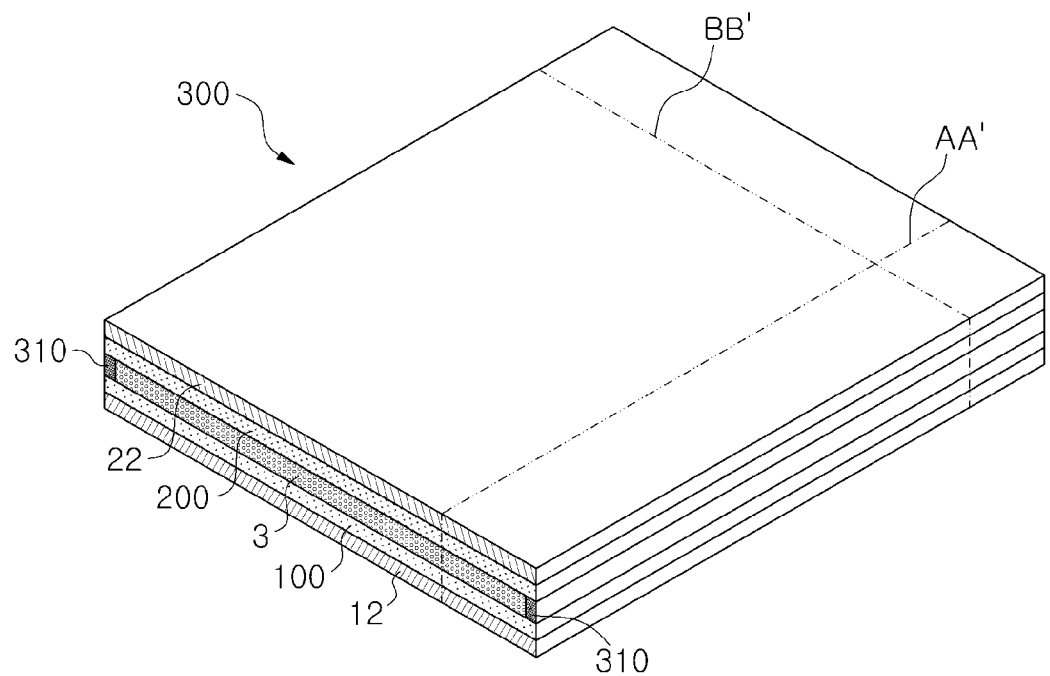
FIG. 3 is a schematic diagram of a liquid crystal panel assembly according to an exemplary embodiment of the present invention.
Figure 4:
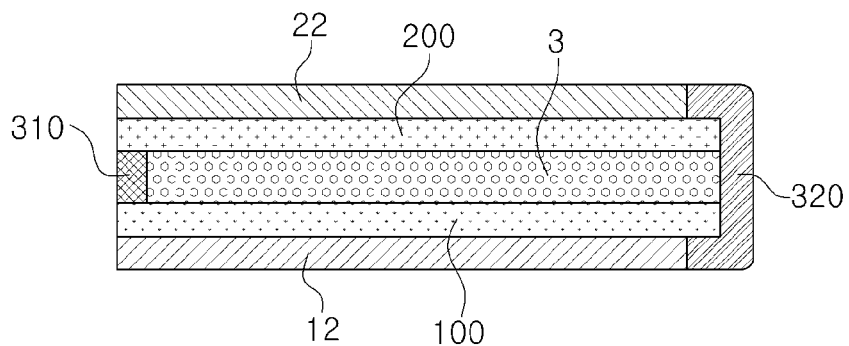
FIG. 4 is a sectional view of a liquid crystal display which is manufactured by cutting a liquid crystal panel assembly shown in FIG. 3 along one direction.

FIG. 4 is a sectional view of a liquid crystal display which is manufactured by cutting a liquid crystal panel assembly shown in FIG. 3 along one direction.

Referring to FIG. 3, liquid crystal panel assembly 300 may be cut along a cutting line AA' or a cutting line BB' depending on the desired size. The cutting line AA' is a direction parallel with gate lines $G_1$ to $G_q$, and the cutting line BB' is a direction parallel with data lines $D_1$ to $D_p$. In case that liquid crystal panel assembly 300 is cut along any direction, the cutting method described hereinafter can be applied in the same way. Hereinafter, as shown in FIG. 1, descriptions will be made based on case in that cutting between gate lines $G_n$ and $G_{n+1}$ is performed by the cutting line AA' and cutting between data lines $D_m$ and $D_{m+1}$ is performed by the cutting line BB'.

At first, polarizers 12 and 22 of liquid crystal panel assembly 300 are stripped by a predetermined width along the cutting line AA' or BB'. If polarizers 12 and 22 are stripped, lower panel 100 and upper panel 200 are exposed. Subsequently, a cutting position is selected so as not to damage gate lines $G_n$ and $G_{n+1}$ and data lines $D_m$ and $D_{m+1}$ by inspecting exposed lower and upper panels 100 and 200 with a microscope or the like. Subsequently, a first scribe line is made to a center depth of upper panel 200 along the selected cutting position using a diamond wheel, a diamond needle, a laser or the like, and liquid crystal panel assembly 300 is turned over and a second scribe line is made to a center depth of lower panel 100 to be coincided with the first scribe line.

Upper panel 200 and lower panel 100 are steadied for about 30 minutes in a state that the scribe lines are formed. Natural crack is formed along the scribe lines formed in two panels 100 and 200 for steadying, so air is introduced into liquid crystal layer 3, and if air is introduced into liquid crystal layer 3, leak of liquid crystal layer 3 is temporarily restricted by the introduced air. After such a steadying step, if a predetermined force is applied from the outside, liquid crystal panel assembly 300 is cut along the scribe lines. A sealant 320 is covered on the cut portion so as to prevent leak of liquid crystal from the cut portion.

By performing these steps, a liquid crystal panel assembly 301 having a desired size can be manufactured. In liquid crystal panel assembly 301 cut along the cutting line AA', gate lines $G_{n+1}$ to $G_q$ are removed and signal lines $G_1$ to $G_n$ and $D_1$ to $D_p$ are remained, and in liquid crystal panel assembly 301 cut along the cutting line BB', data lines $D_{m+1}$ to $D_p$ are removed and signal lines $G_1$ to $G_q$ and $D_1$ to $D_m$ are remained, and liquid crystal panel assembly 300 cut along the cut lines AA' and BB', signal lines $G_1$ to $G_n$ and $D_1$ to $D_m$ are remained. Size and resolution of liquid crystal panel assembly 301 are determined depending on the remained signal lines.

Although liquid crystal panel assembly 301 is manufactured in this way, signal controller 600 and drivers 400 and 500 process signals to be consistent with liquid crystal panel assembly 300 before cutting. Accordingly, it is necessary to display images on liquid crystal panel assembly 301 which is formed by cutting by generating input image signal RGB in a suitable format. It is also possible to change signal controller 600 and drivers 400 and 500 to be suitable to liquid crystal panel assembly 301, but it is easy and advantageous in cost to use signal controller 600 and drivers 400 and 500 without change.

A method of generating input image signal RGB to be consistent with display operation of the cut liquid crystal panel assembly 301 will be described in detail with reference to FIG. 5 to FIG. 11 using various examples.

Figure 5:
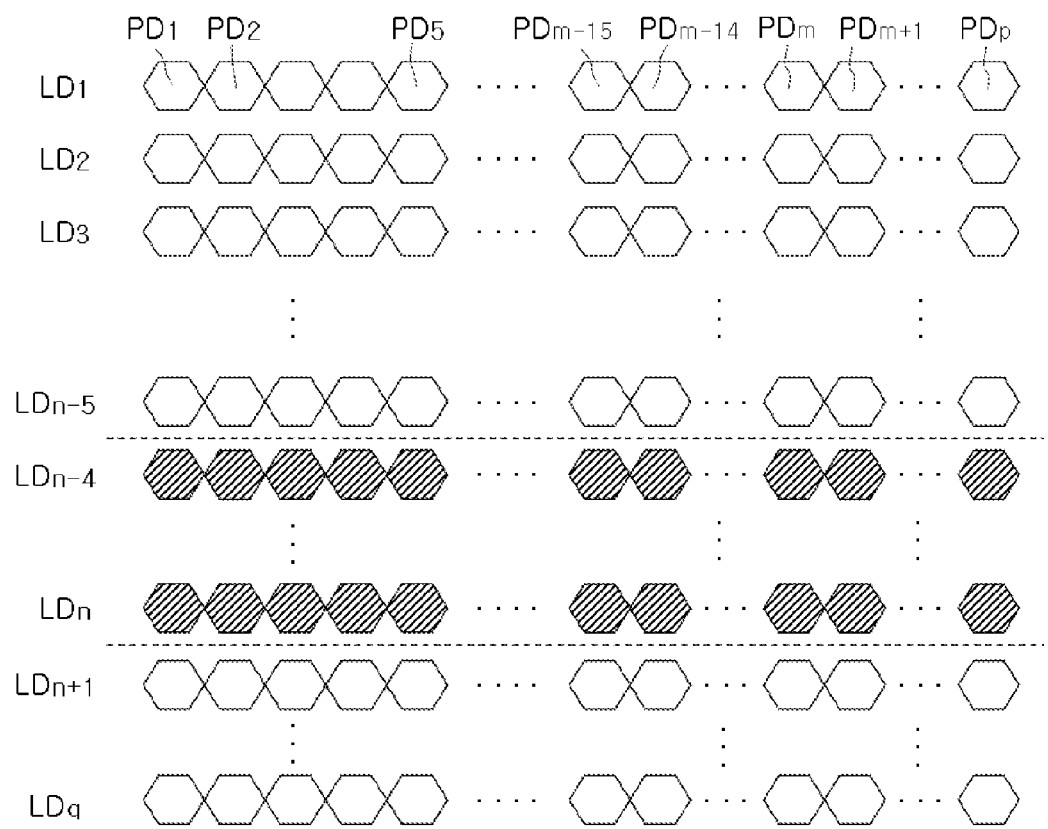
FIG. 5 is a schematic diagram of image data of one frame which is displayed in a liquid crystal display according to an exemplary embodiment of the present invention.
Figure 6:
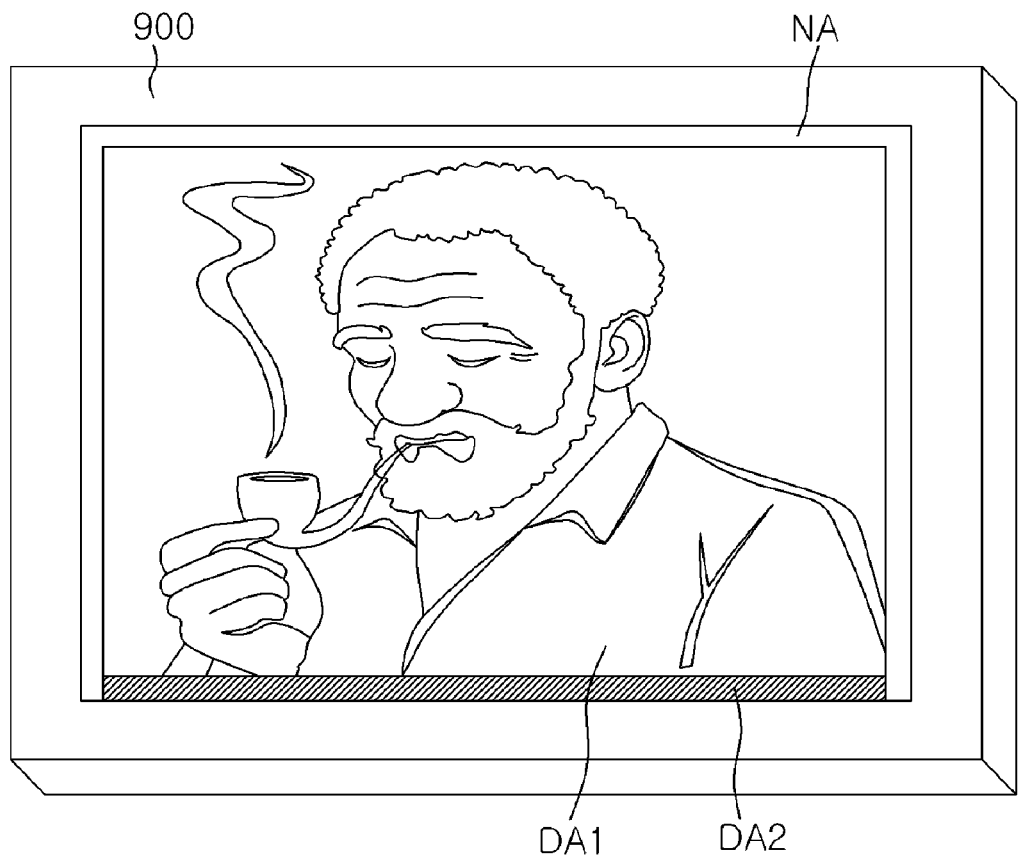
FIG. 6 is a drawing showing one example of a display screen to which an image is displayed by the image data shown in FIG. 5.
Figure 7:
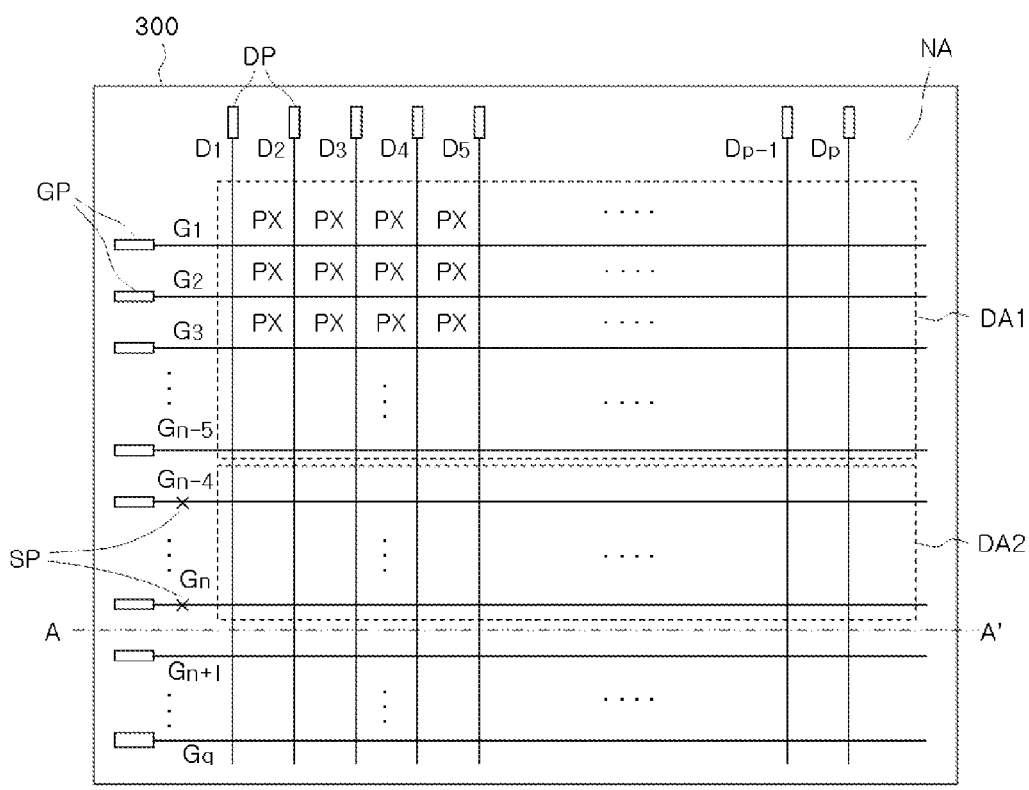
FIG. 7 is a drawing schematically showing a liquid crystal panel assembly for showing the image shown in FIG. 6.

FIG. 5 is a schematic diagram of image data of one frame which is displayed in a liquid crystal display according to an exemplary embodiment of the present invention, FIG. 6 is a drawing showing one example of a display screen to which an image is displayed by the image data shown in FIG. 5, and FIG. 7 is a drawing schematically showing a liquid crystal panel assembly for showing the image shown in FIG. 6. These drawings is for explaining the case that liquid crystal panel assembly 300 is cut along the cutting line AA' according to an embodiment of the present invention.

Referring to FIG. 5, image data of one frame is comprised of line data of $LD_1$ to $LD_q$ of q, and one line data $LD_1$ to $LD_q$ is comprised of pixel data $PD_1$ to $PD_p$ of p. Line data $LD_1$ to $LD_q$ are respectively applied to pixel raw connected to gate lines $G_1$ to $G_q$ corresponding to the corresponding subscript, and pixel data $PD_1$ to $PD_p$ are respectively applied to data lines $D_1$ to $D_p$ corresponding to the corresponding subscript.

Referring to FIG. 6, an edge of liquid crystal display according to an embodiment of the present invention is surrounded by a case 900, and a screen surrounded by which users can see is divided a display area DA1 which occupies most part of the screen, a display area DA2 which exists below display area DA1 and is disposed between display area DA1 and case 900, and non-display area NA which exists at the left side, the right side, and the upper side. In display area DA1 and DA2, pixels exist and desired images can be displayed, but in non-display area NA, a pixels does not exist and a black matrix for blocking light from the bottom is formed so that arbitrary image cannot be displayed and is displayed only in black. Display area DA2 corresponds to an area where gate lines $G_{n-4}$ to $G_n$ over the cutting line AA' exist. In this embodiment, display area DA2 is an area corresponding to 5 gate lines $G_{n-4}$ to $G_n$, but it is not limited thereto and the number thereof can be varied.

Frame data includes normal data, black data, and dummy data depending on displayed contents. The normal data corresponding to line data $LD_1$ to $LD_{n-5}$ is displayed on the display area DA1 of liquid crystal panel assembly 301 and is composed of image data of content which is desired to be displayed. The black data corresponding to line data $LD_{n-4}$ to $LD_n$ is displayed in black on display area DA2 of liquid crystal panel assembly 301. The dummy data corresponding to line data $LD_{n+1}$ to $LD_q$ is data for an area occupied by the removed gate line $G_{n+1}$ to $G_q$ and since it is needed for completion of operation of one frame of signal controller 600 and drivers 400 and 500, it is not displayed on the screen. Accordingly, the dummy data may have an arbitrary data value, and for example, may be "00" or "FF" in case of 256-gray but not limited thereto.

If image is displayed with this image data, display area DA2 below display area DA1 is always displayed in black as shown in FIG. 6, so display area DA2 acts just as non-display area NA. Accordingly, non-display area NA and display area DA2 surrounding display area DA1 is seen in black, so image displayed in display area DA1 can be well-balancedly displayed without being biased in the whole screen.

Referring to FIG. 7, in liquid crystal panel assembly 300 according to an embodiment of the present invention, horizontal lines $G_1$ to $G_q$ are formed, and vertical data lines $D_1$ to $D_p$ are formed. A gate pad GP is formed on a left end of respective gate lines $G_1$ to $G_q$, and a data pad DP is formed on a upper end of respective data lines $D_1$ to $D_p$. Gate driver 400 and data driver 500 may be respectively mounted to or flexible printed circuits may be respectively attached to gate pad GP and data pad DP. Gate signal from gate driver 400 is transmitted to gate lines $G_1$ to $G_q$ via gate pad GP, and data signal from data driver 500 is transmitted to data lines $D_1$ to $D_p$ via data pad DP.

After liquid crystal panel assembly 300 is cut along the cutting line AA', gate lines $G_{n-4}$ to $G_n$ corresponding to display area DA2 is cut from the corresponding gate pad GP using a laser or the like (marked by 'x'), and is connected to a signal line to which the gate-off voltage Voff is applied. Cutting point and/or connecting point SP may be preferably positioned in the non-display area NA where the corresponding gate lines $G_{n-4}$ to $G_n$ are formed. So, the gate-off voltage is transmitted to the corresponding gate lines $G_{n-4}$ to $G_n$, and since the gate-off voltage Voff is −7V to −5V, the switching element Q connected to the corresponding gate lines $G_{n-4}$ to $G_n$ are always turned off. Accordingly, whenever any image data is transmitted to the corresponding pixel PX, display area DA2 is always displayed in black. In this case, liquid crystal mode of liquid crystal panel assembly 300 shown in FIG. 7 should be normally black which displays black when image signal is not applied, and PVA (patterned vertical alignment) mode is one of such modes.

Gate lines $G_{n-4}$ to $G_n$, if necessary, are cut from the corresponding gate pad GP and is then connected to the common voltage, and in this case, it is preferable that the common voltage is less than or equal to 0V.

In case that a portion (e.g., gate lines $G_{n-3}$ to $G_n$) of gate lines $G_{n-4}$ to $G_n$ of display area DA2 are not connected to gate driver 400 so as not to be supplied with gate signal depending on positions of the cutting line AA' and the gate pad GP, gate signal supplied to gate line $G_{n-4}$ can be supplied to gate lines $G_{n-3}$ to $G_n$ by connecting gate lines $G_{n-3}$ to $G_n$ to gate line $G_{n-4}$ using a repair line (not shown), so black data corresponding to line data $LD_{n-4}$ is applied to the whole pixels PX of display area DA2 so that display area DA2 is displayed in black.

Figure 8:
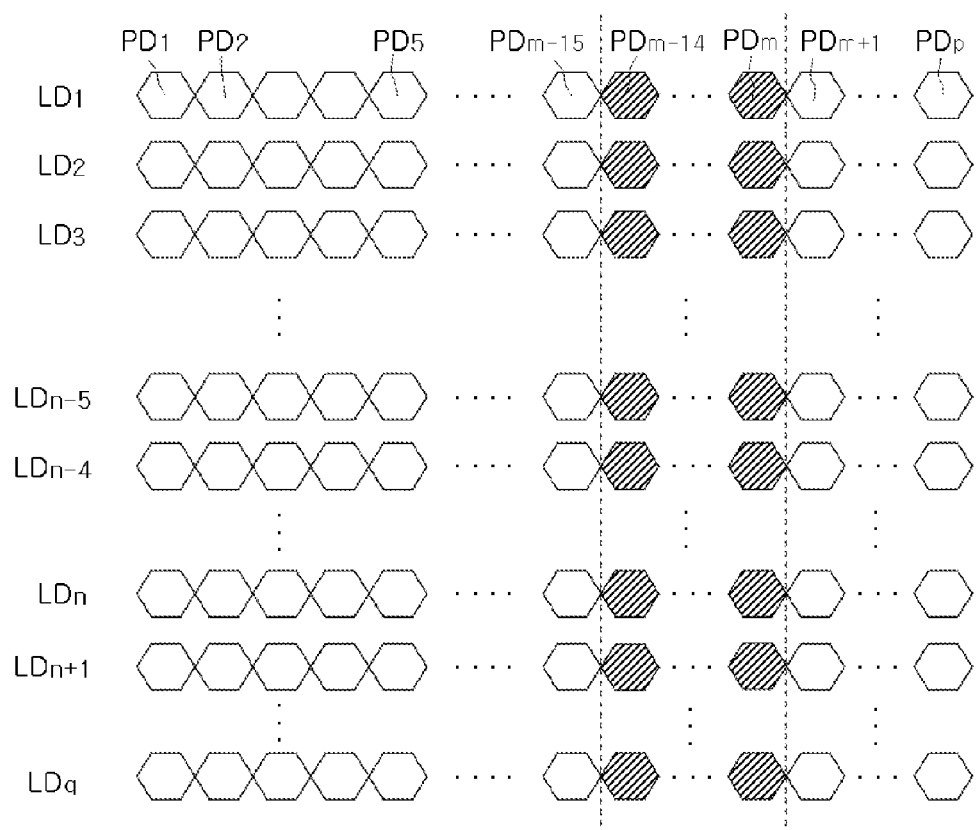
FIG. 8 is a schematic diagram of image data of one frame which is displayed in a liquid crystal display according to another exemplary embodiment of the present invention.
Figure 9:
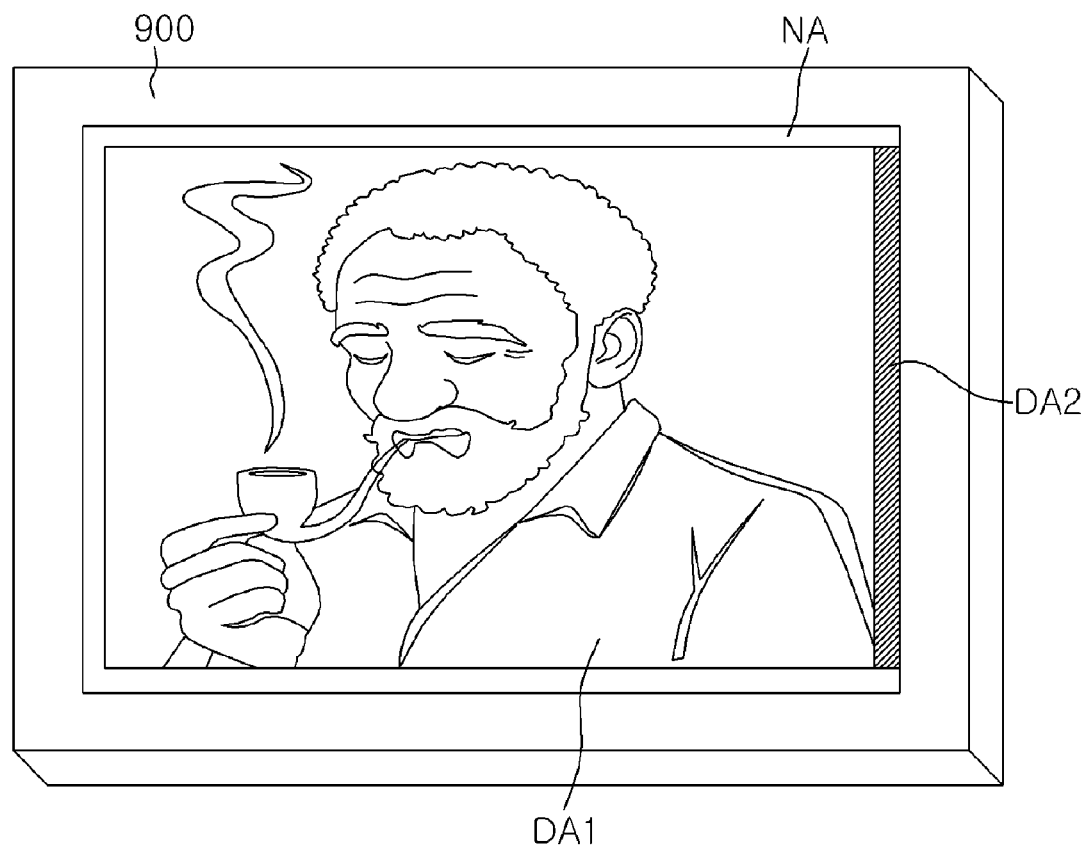
FIG. 9 is a drawing showing one example of a display screen to which an image is displayed by the image data shown in FIG. 8.

FIG. 8 is a schematic diagram of image data of one frame which is displayed in a liquid crystal display according to another exemplary embodiment of the present invention, and FIG. 9 is a drawing showing one example of a display screen to which an image is displayed by the image data shown in FIG. 8. These drawings are for explaining the case that liquid crystal panel assembly 300 according to an embodiment of the present invention is cut along the cutting line BB'. Explanation for parts which are identical with the above-described embodiment will be omitted.

Among image data of one frame shown in FIG. 8, the normal data is comprised of pixel data $PD_1$ to $PD_{m-15}$ of respective line data $LD_1$ to $LD_q$, the black data is comprised of pixel data $PD_{m-14}$ to $PD_m$ of respective line data $LD_1$ to $LD_q$, and the dummy data is comprised of pixel data $PD_{m+1}$ to $PD_p$ of respective line data $LD_1$ to $LD_q$.

Referring to FIG. 9, in a liquid crystal display according to an embodiment of the present invention, display area DA2 is disposed at the right side of display area DA1, and corresponds to an area where data lines $D_{m-14}$ to $D_m$ at the left side of the cutting line BB' of the cut liquid crystal panel assembly 301 exists. In this embodiment, display area DA2 is an area corresponding to 15 data lines $D_{m-14}$ to $D_m$, but the number of data lines is not limited thereto and may be varied. A dot which is a basic unit for display one image is formed by combination of a plurality of pixels PX (in this embodiment, three pixels form one dot), so the number of data lines $D_{m-14}$ to $D_m$ corresponding to display area DA2 is greater than the number of gate lines $G_{n-4}$ to $G_n$ in the above-described embodiment.

If image is displayed with this image data, display area DA2 at the right side of display area DA1 is always displayed in black as shown in FIG. 9, so display area DA2 acts just as non-display area NA. Accordingly, non-display area NA and display area DA2 surrounding display area DA1 is seen in black, so image displayed in display area DA1 can be well-balancedly displayed without being biased in the whole screen.

Figure 10:
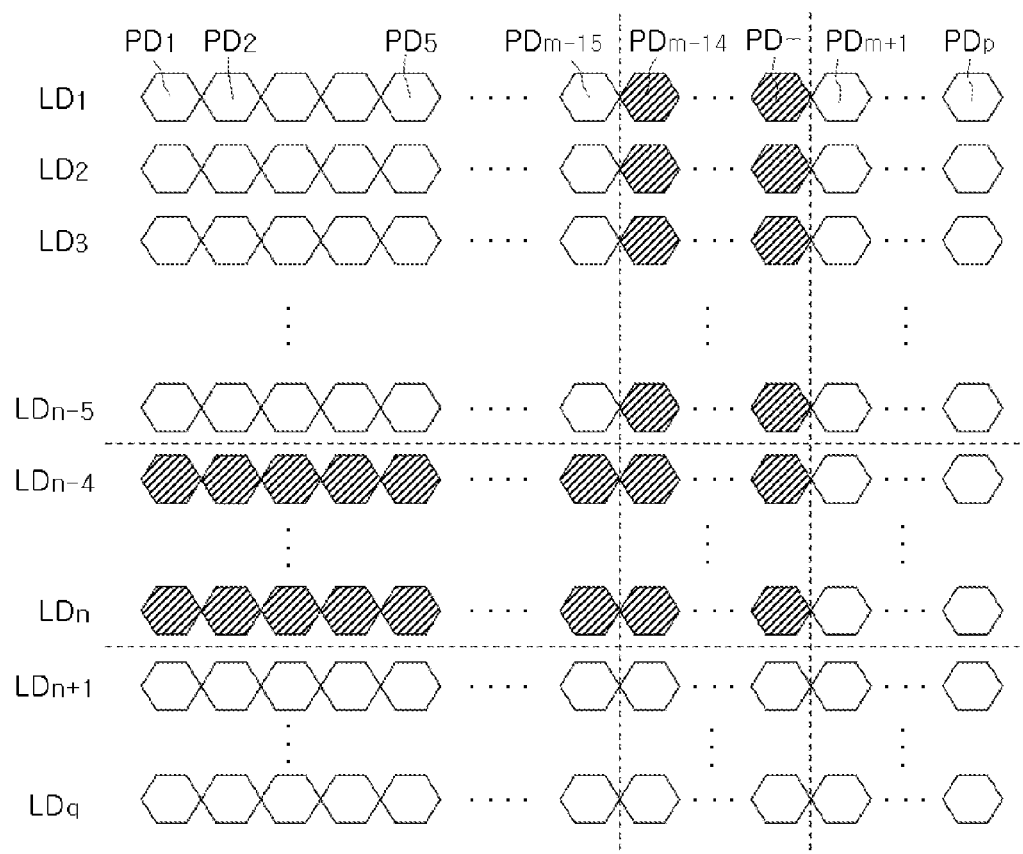
FIG. 10 is a schematic diagram of image data of one frame which is displayed in a liquid crystal display according to yet another exemplary embodiment of the present invention.
Figure 11:
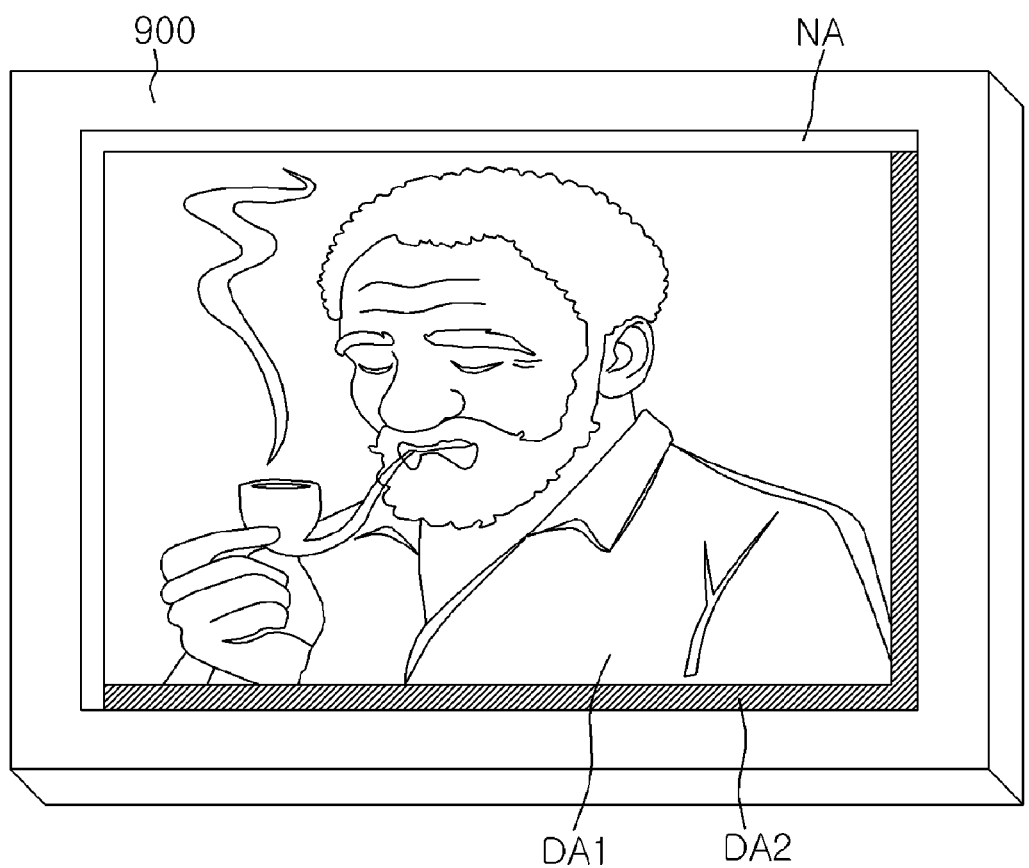
FIG. 11 is a drawing showing one example of a display screen to which an image is displayed by the image data shown in FIG. 10.

FIG. 10 is a schematic diagram of image data of one frame which is displayed in a liquid crystal display according to yet another exemplary embodiment of the present invention, and FIG. 11 is a drawing showing one example of a display screen to which an image is displayed by the image data shown in FIG. 10. These drawings are for explaining the case that liquid crystal panel assembly 300 according to an embodiment of the present invention is cut along the cutting lines AA' and BB'. Explanation for parts which are identical with the above-described embodiment will be omitted.

Among image data of one frame shown in FIG. 10, the normal data is comprised of pixel data $PD_1$ to $PD_{m-15}$ of respective line data $LD_1$ to $LD_{n-5}$, the black data is comprised of pixel data $PD_{m-14}$ to $PD_m$ of respective line data $LD_1$ to $LD_{n-5}$ and pixel data $PD_1$ to $PD_m$ of respective line data $LD_{n-4}$ to $LD_n$, and the dummy data is comprised of pixel data $PD_{m+1}$ to $PD_p$ of respective line data $LD_1$ to $LD_n$ and line data $LD_{n+1}$ to $LD_q$.

Referring to FIG. 11, in a liquid crystal display according to an embodiment of the present invention, display area DA2 is disposed at the right side of and below display area DA1, and corresponds to an area where gate lines $G_{n-4}$ to $G_n$ over the cutting line AA' and data lines $D_{m-14}$ to $D_m$ at the left side of the cutting line BB' of the cut liquid crystal panel assembly 301 exist.

If image is displayed with this image data, display area DA2 at the right side of and below display area DA1 is always displayed in black as shown in FIG. 11, so display area DA2 acts just as non-display area NA. Accordingly, non-display area NA and display area DA2 surrounding display area DA1 is seen in black, so image displayed in display area DA1 can be well-balancedly displayed without being biased in the whole screen.

In this embodiment, as shown in FIG. 7, by cutting gate lines $G_{n-4}$ to $G_n$ corresponding to display area DA2 from the corresponding gate pad GP using a laser or the like and connecting the same to the gate-off voltage Voff, display area DA2 which is disposed below display area DA1 can be displayed in black. In addition, by connecting gate lines $G_{n-3}$-$G_n$ of display area DA2 which are cut from gate driver 400 to gate line $G_{n-4}$, display area DA2 can be displayed in black.

Although in the above-described embodiments display area DA2 is disposed below or at the right side of display area DA1, display area DA2 may be disposed over or at the left side of display area DA1 depending on positions of gate driver 400 and data driver 500.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a liquid crystal panel assembly including a plurality of gate lines, a plurality of data lines crossing with the gate lines, and a plurality of pixels which are respectively connected to one of gate lines and one of the data lines; and
   a driver providing an image signal to the pixels,
   wherein at least a portion of a non-display area of the liquid crystal panel assembly is cut and removed, and the driver displays black at a first display area in the vicinity of the removed non-display area.

2. The liquid crystal display of claim 1, wherein the liquid crystal panel assembly is cut along the gate line and the first display area is formed along the gate line.

3. The liquid crystal display of claim 2, wherein the first display area corresponds to at least one gate line, and the driver provides black data to a pixel connected to the at least one gate line.

4. The liquid crystal display of claim 2, wherein the first display are corresponds to at least one gate line, and the at least one gate line is connected to gate-off voltage.

5. The liquid crystal display of claim 2, wherein the first display area corresponds to a plurality of gate lines, and at least two gate lines of the plurality of the gate lines are connected to each other.

6. The liquid crystal display of claim 1, wherein the liquid crystal panel assembly is cut along the data line and the first display area is formed along the data line.

7. The liquid crystal display of claim 6, wherein the first display area corresponds to at least one data line, and the driver provides black data to a pixel connected to the at least one data line.

8. The liquid crystal display of claim 1, wherein the liquid crystal panel assembly is cut along the gate line and along the data line and the first display area is formed along the gate line and along the data line.

9. The liquid crystal display of claim 8, wherein the first display area corresponds to at least one gate line and at least one data line, and the driver provides black data to a pixel connected to the at least one gate line and to at least one data line.

10. The liquid crystal display of claim 1, wherein the driver provides dummy data to the liquid crystal panel assembly.

11. A method of displaying image of a liquid crystal display including a liquid crystal panel assembly including a plurality of gate lines, a plurality of data lines crossing with the gate lines, and a plurality of pixels which are respectively connected to one of gate lines and one of the data lines, comprising displaying black in a first display area of the liquid crystal panel assembly,
wherein a non-display area of the liquid crystal panel assembly in the vicinity of the first display area is cut and removed.

12. The method of claim 11, wherein the liquid crystal panel assembly is cut along the gate line and the first display area is formed along the gate line.

13. The method of claim 12, wherein the first display area corresponds to at least one gate line, and further comprising providing black data to a pixel connected to the at least one gate line.

14. The method of claim 12, wherein the first display are corresponds to at least one gate line, and the at least one gate line is connected to gate-off voltage.

15. The method of claim 12, wherein the first display area corresponds to a plurality of gate lines, and at least two gate lines of the plurality of the gate lines are connected to each other.

16. The method of claim 11, wherein the liquid crystal panel assembly is cut along the data line and the first display area is formed along the data line.

17. The method of claim 16, wherein the first display area corresponds to at least one data line, and further comprising providing black data to a pixel connected to the at least one data line.

18. The method of claim 11, wherein the liquid crystal panel assembly is cut along the gate line and along the data line and the first display area is formed along the gate line and along the data line.

19. The method of claim 18, wherein the first display area corresponds to at least one gate line and at least one data line, and further comprising providing black data to a pixel connected to the at least one gate line and to at least one data line.

20. The method of claim 11, further comprising providing dummy data to the liquid crystal panel assembly.

* * * * *